(12) United States Patent
Spierling

(10) Patent No.: US 10,800,246 B2
(45) Date of Patent: Oct. 13, 2020

(54) HYBRID ELECTRIC PROPULSION POWER SUPPLY

(71) Applicant: Hamilton Sundstrand Corporation, Charlotte, NC (US)

(72) Inventor: Todd A. Spierling, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/216,480

(22) Filed: Dec. 11, 2018

(65) Prior Publication Data

US 2020/0180419 A1     Jun. 11, 2020

(51) Int. Cl.
*B60K 6/26*     (2007.10)
*B60K 6/28*     (2007.10)

(52) U.S. Cl.
CPC . *B60K 6/26* (2013.01); *B60K 6/28* (2013.01)

(58) Field of Classification Search
CPC ..................................... B60K 6/26; B60K 6/28
See application file for complete search history.

(56) References Cited

U.S. PATENT DOCUMENTS

| 2005/0085980 A1* | 4/2005 | Kawashima | B60K 6/44 701/53 |
| 2006/0138995 A1* | 6/2006 | Sugita | B60K 6/44 318/811 |
| 2014/0058603 A1* | 2/2014 | Ito | B60K 6/445 701/22 |
| 2014/0058604 A1* | 2/2014 | Ito | B60W 10/06 701/22 |
| 2014/0074334 A1* | 3/2014 | Tagawa | B60K 6/445 701/22 |
| 2017/0225579 A1* | 8/2017 | Mascia | B60L 11/1822 |
| 2018/0141442 A1* | 5/2018 | Pu | B60L 50/61 |
| 2018/0226905 A1* | 8/2018 | Botts | B60L 58/19 |

(Continued)

FOREIGN PATENT DOCUMENTS

| DE | 102009039684 A1 | 3/2011 |
| EP | 1894767 A1 | 3/2008 |

OTHER PUBLICATIONS

"Hybrid vehicle drivetrain—Wikipedia", Jul. 26, 2018 (Jul. 26, 2018), XP055680848, Retrieved from the Internet: URL: https://en.wikipedia.org/w/index.php title=Hybrid_vehicle_drivetrain&oldid=85212 7052#Series_hybrid [retrieved on Mar. 30, 2020].

(Continued)

*Primary Examiner* — Erez Gurari
(74) *Attorney, Agent, or Firm* — Locke Lord LLP; Daniel J. Fiorello; Scott D. Wofsy

(57) ABSTRACT

A hybrid propulsion system can include an electric motor configured to convert electrical energy into motion, a battery configured to store electrical energy and operatively connected to the electric motor to provide a battery output to the electric motor and a generator configured to convert non-electrical energy into electrical energy, the generator operatively connected to the electric motor to provide a generator output to the motor simultaneously with the battery output. The system can include a controller operatively connected to the generator and configured to control the generator output of the generator as a function one or more of a state of the battery or the battery output.

5 Claims, 3 Drawing Sheets

(56) References Cited

U.S. PATENT DOCUMENTS

2018/0236999 A1* 8/2018 Miyama ................ B60K 6/26
2018/0354354 A1* 12/2018 Jin ....................... B60L 50/61

OTHER PUBLICATIONS

"Diesel locomotive—Wikipedia", Dec. 8, 2018 (Dec. 8, 2018), XP055681037, Retrieved from the Internet: URL: https://en.wikipedia.org/w/index.php title=Diesel locomotive&oldid=872621386#Diesel-electric [retrieved on Mar. 30, 2020].
Christine Ross et al: "Turboelectric Distributed Propulsion Protection System Design Trades", SAE Technical Paper Series, vol. 1, Sep. 16, 2014 (Sep. 16, 2014), XP055425021.
Extended European search report issued in corresponding EP application No. 19214655.3, dated Apr. 24, 2020.

* cited by examiner

HYBRID ELECTRIC PROPULSION POWER SUPPLY

BACKGROUND

1. Field

The present disclosure relates to hybrid electric propulsion systems and power supply therefor.

2. Description of Related Art

Hybrid electric propulsion systems may use a combination of sources to provide electrical power to drive motor driven propulsors. This electric power may come from batteries, or it may come from an engine burning, e.g., liquid fuel and driving a generator. Typically, it is desired to control how much power comes from each source at any given moment in time. Traditional systems use complex and heavy power electronics between the generator or battery supply to condition the power from each source.

Such conventional methods and systems have generally been considered satisfactory for their intended purpose. However, there is still a need in the art for improved hybrid electric propulsion systems power supplies. The present disclosure provides a solution for this need.

SUMMARY

A hybrid propulsion system can include an electric motor configured to convert electrical energy into motion, a battery configured to store electrical energy and operatively connected to the electric motor to provide a battery output to the electric motor and a generator configured to convert non-electrical energy into electrical energy, the generator operatively connected to the electric motor to provide a generator output to the motor simultaneously with the battery output. The system can include a controller operatively connected to the generator and configured to control the generator output of the generator as a function one or more of a state of the battery or the battery output.

The controller can be configured to match at least one quality of the generator output to a same at least one quality of the battery output. The at least one quality can be voltage such that the controller is configured to match a generator output voltage to a battery output voltage. Any other suitable quality (e.g., current, power) is contemplated herein.

In certain embodiments, the generator can include a permanent magnet generator and an engine operatively connected to the permanent magnet generator. The controller can be configured to control a speed of the engine to control the generator output to match the voltage. Any other suitable type of generator is contemplated herein.

In certain embodiments, both the battery and the generator can be directly connected to the electric motor such that the system does not include any power electronics between the battery and the electric motor or the generator and the electric motor.

In certain embodiments, the system can include a state of charge sensor configured to sense a state of charge of the battery. The controller can be configured to receive a signal from the state of charge sensor and control a generator voltage and/or a generator power of the generator based on stored data that correlates state of charge to a battery voltage and/or battery power. For example, where the generator includes a permanent magnet generator (e.g., and/or an engine), the controller can be configured to control a speed of the generator (and/or engine) to control the generator voltage and/or generator power based on stored generator data that correlates generator speed to generator voltage.

In certain embodiments, the system can include a battery output sensor disposed between the battery and the electric motor, and a generator output sensor disposed between the generator and the electric motor. The controller can be configured to receive signals from both the battery output sensor and the generator output sensor to control the generator output with a feedback loop to match the at least one quality.

In accordance with at least one aspect of this disclosure, a controller for a hybrid propulsion system can include one or more hardware and/or software modules configured to operatively connect to a generator configured to convert non-electrical energy into electrical energy. The controller can be configured to control a generator output of the generator as a function one or more of a state of a battery or a battery output of the battery to provide the controlled generator output from the generator to an electric motor simultaneously with the battery output. The controller can be or include any suitable controller as described herein.

In accordance with at least one aspect of this disclosure, a method for powering an electric motor can include providing electricity to an electric motor from a battery and a generator simultaneously, and controlling a generator output of the generator to match at least one quality of a battery output of the battery. The at least one quality can include one or more of voltage, current, or power.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
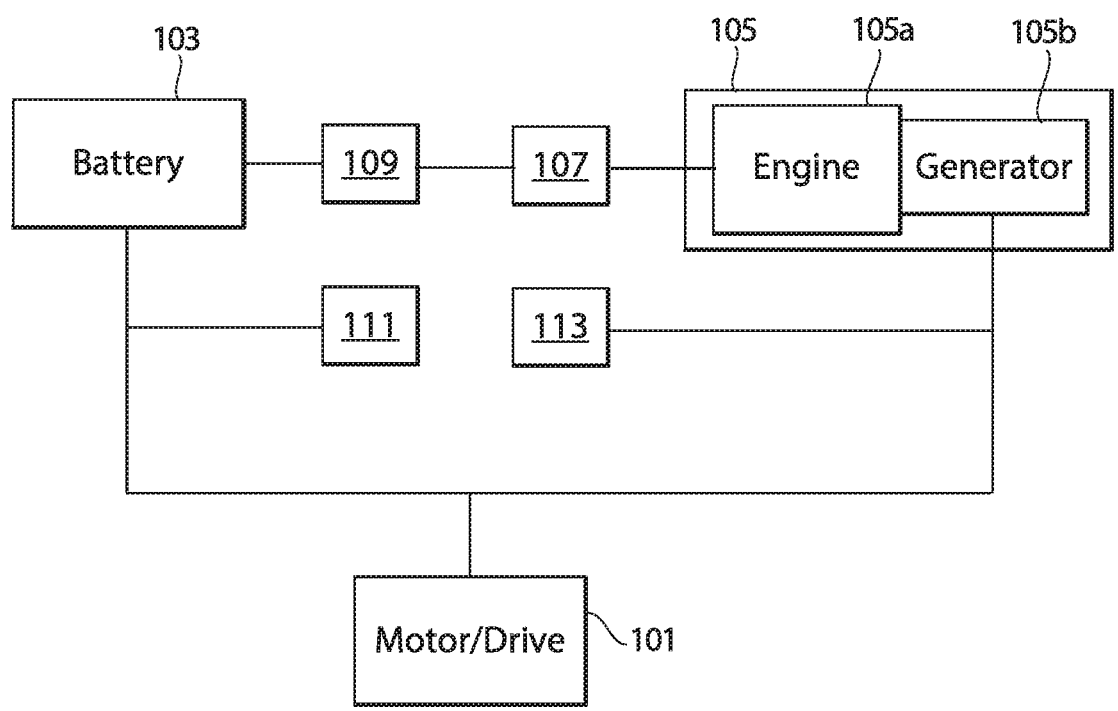
FIG. 1 is a schematic of an embodiment of a system in accordance with this disclosure.
Figure 2:
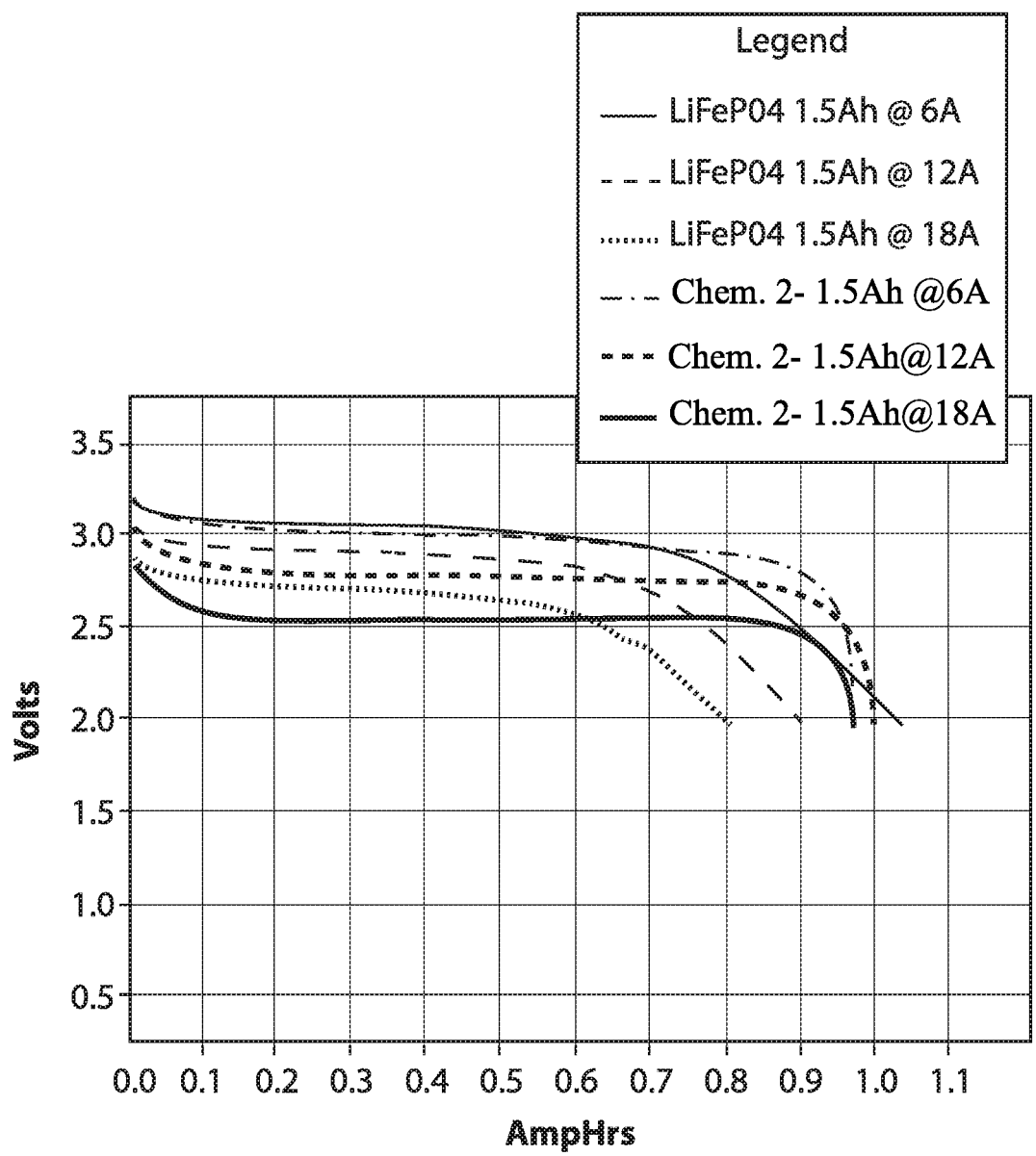
FIG. 2 is a chart showing the voltage as function of state of charge and current of two embodiments of batteries.
Figure 3:
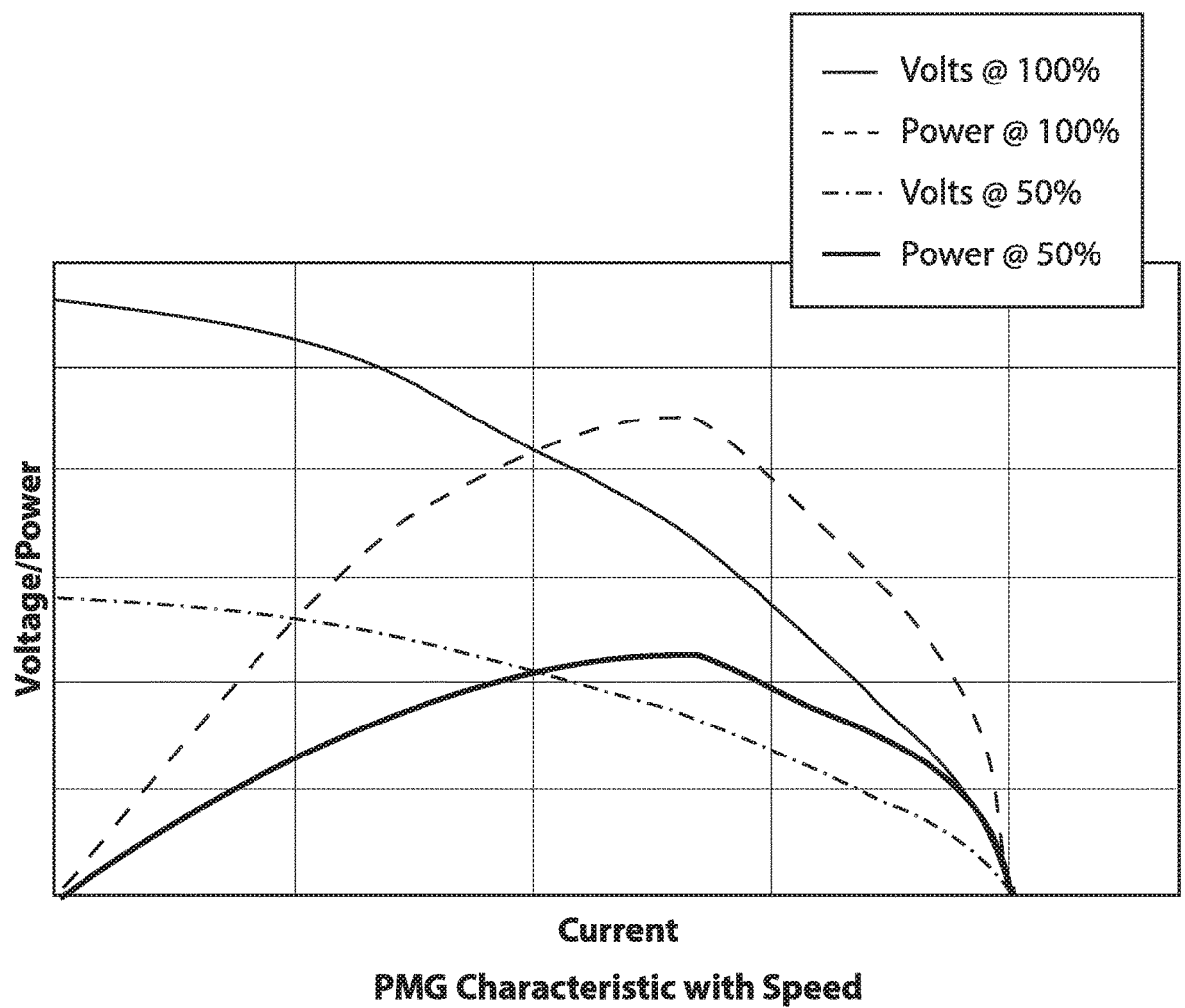
FIG. 3 is a chart showing the relationship between voltage and current of a permanent magnet generator as a function of percent speed of the generator.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3.

Referring to FIG. 1, a hybrid propulsion system 100 can include an electric motor 101 configured to convert electrical energy into motion. The system 100 can include a battery 103 (e.g., comprising one or more battery cells of any suitable type or combination) configured to store electrical energy and operatively connected to the electric motor 101 to provide a battery output to the electric motor 101. The system 100 can also include a generator 105 configured to convert non-electrical energy into electrical energy. The generator 105 can be operatively connected to the electric motor 101 to provide a generator output to the motor 101 simultaneously with the battery output.

The system 100 can include a controller 107 operatively connected to the generator 105 and configured to control the generator output of the generator 105 as a function one or more of a state of the battery 101 (e.g., state of charge) or the battery output. The controller 107 can include any suitable hardware and/or software module(s) configured to perform any suitable function as disclosed herein. In certain embodiments, the controller 107 can be at least partially integrated with any suitable portion of system 100 and/or any other suitable controller used with system 100 (e.g., a battery controller, an engine controller, a motor controller). In certain embodiments, the controller 107 can be an at least partially (e.g., entirely) separate from any other portion of system 100.

The controller 107 can be configured to match at least one quality of the generator output to a same at least one quality of the battery output. The at least one quality can be voltage such that the controller 107 is configured to match a generator output voltage to a battery output voltage. Any other suitable quality (e.g., current, power) is contemplated herein (individually or in any combination).

In certain embodiments, as shown in FIG. 1, the generator 105 can include a permanent magnet generator 105a and an engine 105b operatively connected (e.g., directly) to the permanent magnet generator 105a to turn the permanent magnet generator 105a. In certain embodiments, the controller 107 can be configured to control a speed of the engine 105b to control the generator output to match the voltage of the battery 103. In certain embodiments, the system 100 can include speed control of the permanent magnet generator 105a (or other suitable generator type) independent of engine speed (e.g., using a transmission). In certain embodiments, both the battery 103 and the generator 105 can be directly connected to the electric motor 101 as shown such that the system 100 does not include any power electronics between the battery 103 and the electric motor 101 or the generator 105 and the electric motor 101. This can reduce the overall weight of the system 100 while providing still allowing proper power signals.

In certain embodiments, the system 100 can include a state of charge sensor 109 configured to sense a state of charge of the battery 103. The controller 107 can be operatively connected to and configured to receive a signal from the state of charge sensor 109. In certain embodiments, the controller 107 can be configured to control a generator voltage and/or a generator power of the generator 105 based on stored data (e.g., as shown in FIG. 2) that correlates state of charge to a battery voltage (e.g., as a function of current) and/or battery power. For example, referring additionally to FIGS. 2 and 3, where the generator 105 includes a permanent magnet generator 105a (e.g., and/or an engine), the controller 107 can be configured to control a speed of the generator 105a (and/or engine 105b) to control the generator voltage and/or generator power based on stored generator data (e.g., shown in FIG. 3) that correlates generator speed to generator voltage (and/or current/power).

In certain embodiments, the system 100 can include a battery output sensor 111 disposed between the battery 103 and the electric motor 101. In certain embodiments, the system 100 can include a generator output sensor 111 disposed between the generator 105 and the electric motor 101. The controller 107 can be configured to receive signals from one or both the battery output sensor 111 and the generator output sensor 113 to control the generator output with a feedback loop to match the at least one quality (e.g., to match a sensed or predicted voltage of the battery 103 to a sensed or predicted voltage of the generator 105).

In accordance with at least one aspect of this disclosure, a method for powering an electric motor 101 can include providing electricity to an electric motor 101 from a battery 103 and a generator 105 simultaneously, and controlling a generator output of the generator 105 to match at least one quality of a battery output of the battery 103. The at least one quality can include one or more of voltage, current, or power, for example. Any other suitable quality is contemplated herein.

In certain systems, both a battery and a generator should have the same voltage levels if using both simultaneously. Embodiments can control a generator output to match the battery voltage, for example. Traditional systems use complex dedicated power electronics for both battery and generator. Certain embodiments allow battery voltage to power motor directly and use speed control of a permanent magnet generator to match voltage of battery instead of complex and heavy power electronics. Certain embodiments may only have basic contactor/switches (e.g., controlled be a controller, e.g., 107) between the battery/generator and the motor to turn each on or off.

Embodiments can control the voltage of the generator based on charge state and the current load of the motor. Embodiments allow electricity for propulsion to come from both a battery and a generator (e.g., a fuel engine/generator combination) while maintaining matching voltage, for example. As the battery discharges, the voltage of the battery drops, and this can be accounted for by changing the speed of a permanent magnet generator to change the voltage commensurate with the voltage drop of the battery.

For example, in certain embodiments, the generator can be a permanent magnet generator with passive rectification, which has no inherent voltage regulation capability. Control of generator voltage (and resultant power output relative to the battery) can be done through speed control of the permanent magnet generator and/or engine that is driving that generator instead of through active power electronics conversion.

Embodiments combine the strengths of a permanent magnet machine (simplicity, weight, efficiency, speed, and cost advantages relative to a wound field machine) with the strengths of passive power conversion (simplicity, weight, efficiency, and cost advantages relative to an active rectification), while still offering the voltage regulation needed for system functionality.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid propulsion system, comprising:
an electric motor configured to convert electrical energy into motion;
a battery configured to store electrical energy and operatively connected to the electric motor to provide a battery output to the electric motor;
a generator configured to convert non-electrical energy into electrical energy, the generator operatively connected to the electric motor to provide a generator output to the motor simultaneously with the battery output; and
a controller operatively connected to the generator and configured to control the generator output of the generator as a function one or more of a state of the battery or the battery output, wherein the controller is configured to match at least one quality of the generator output to a same at least one quality of the battery output, wherein the at least one quality is voltage such that the controller is configured to match a generator output voltage to a battery output voltage, wherein the generator includes a permanent magnet generator and an engine operatively connected to the permanent magnet generator, wherein the controller is configured to control a speed of the engine to control the generator output to match the voltage, wherein both the battery and the generator are directly connected to the electric motor such that the system does not include any power electronics between the battery and the electric motor or the generator and the electric motor.

2. The system of claim 1, further comprising a state of charge sensor configured to sense a state of charge of the battery.

3. The system of claim 2, wherein the controller is configured to receive a signal from the state of charge sensor and control a generator voltage and/or a generator power of the generator based on stored data that correlates state of charge to a battery voltage and/or battery power.

4. The system of claim 3, wherein the generator is a permanent magnet generator, and wherein the controller is configured to control a speed of the generator to control the generator voltage and/or generator power based on stored generator data that correlates generator speed to generator voltage.

5. The system of claim 1, further comprising a battery output sensor disposed between the battery and the electric motor, and a generator output sensor disposed between the generator and the electric motor, wherein the controller is configured to receive signals from both the battery output sensor and the generator output sensor to control the generator output with a feedback loop to match the at least one quality.

* * * * *